(12) United States Patent
Wang et al.

(10) Patent No.: US 11,333,591 B2
(45) Date of Patent: May 17, 2022

(54) TRI-AXIAL MECHANICAL TEST APPARATUS AND METHOD FOR SIMULATING THE PROCESS OF FREEZING HIGH-PRESSURE WATER INTO ICE

(71) Applicant: CHINA UNIVERSITY OF MINING AND TECHNOLOGY, Jiangsu (CN)

(72) Inventors: Baosheng Wang, Jiangsu (CN); Weihao Yang, Jiangsu (CN); Jiahui Huang, Jiangsu (CN); Tao Han, Jiangsu (CN); Chi Zhang, Jiangso (CN); Zhijiang Yang, Jiangsu (CN); Tao Zhang, Jiangsu (CN); Yansen Wang, Jiangsu (CN); Yanlong Ren, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 597 days.

(21) Appl. No.: 16/341,128

(22) PCT Filed: Jun. 25, 2018

(86) PCT No.: PCT/CN2018/092553
§ 371 (c)(1),
(2) Date: Apr. 11, 2019

(87) PCT Pub. No.: WO2019/148744
PCT Pub. Date: Aug. 8, 2019

(65) Prior Publication Data
US 2021/0325285 A1    Oct. 21, 2021

(30) Foreign Application Priority Data
Feb. 2, 2018    (CN) .......................... 201810107065.4

(51) Int. Cl.
*G01N 3/12*    (2006.01)
*F25C 1/12*    (2006.01)
*G01N 3/18*    (2006.01)

(52) U.S. Cl.
CPC ............... *G01N 3/12* (2013.01); *F25C 1/125* (2013.01); *G01N 3/18* (2013.01);
(Continued)

(58) Field of Classification Search
CPC .... G01N 3/12; G01N 3/18; G01N 2203/0019; G01N 2203/0228; G01N 2203/0256;
(Continued)

(56) References Cited

FOREIGN PATENT DOCUMENTS

| CN | 102252918 A | * | 11/2011 |
| CN | 102252918 A |   | 11/2011 |

(Continued)

*Primary Examiner* — Marrit Eyassu
(74) *Attorney, Agent, or Firm* — Saliwanchik, Lloyd & Eisenschenk

(57) ABSTRACT

The present invention relates to a tri-axial mechanical test apparatus and method for simulating the process of freezing the high-pressure water into ice. The tri-axial mechanical test apparatus comprises a main body loading system, a freezing system, and a sample test system; in the main body loading system, a flange, an axial pressure piston and a pressure-bearing shell are constituted to a loading main body, and the axial pressure and confining pressure are controlled directly by a tri-axial servo tester and indirectly by an oil-water separator respectively; in the freezing system, a circumferential freezing liquid circulation channel and a base freezing liquid circulation channel are connected to an external cold source for cooling and freezing, and a dissoluble shell is provided on the periphery of the sample to ensure the shape of ice; in the sample test system, a serial of optical fiber sensors in the sample is connected to an optical fiber data collector, to measure temperature and
(Continued)

strain. The present invention cooperates with a tri-axial servo tester, an oil-water separator, an external cold source and an optical fiber data collector, so that the water can be frozen into ice under pressure under the confinement of a dissoluble shell that is dissolved after an ice sample is formed, and then the tri-axial mechanical test can be carried out directly in the original stress state after water is frozen into ice under pressure.

7 Claims, 2 Drawing Sheets

(52) U.S. Cl.
CPC ........... *G01N 2203/0019* (2013.01); *G01N 2203/0228* (2013.01); *G01N 2203/0256* (2013.01)

(58) Field of Classification Search
CPC .. G01N 1/42; G01N 3/10; G01N 3/24; G01N 2203/0025; G01N 2203/0048; G01N 2203/0075; F25C 1/125; G01D 21/02
USPC .......................................................... 73/37
See application file for complete search history.

(56) References Cited

FOREIGN PATENT DOCUMENTS

| | | | |
|---|---|---|---|
| CN | 103116014 A | * | 5/2013 |
| CN | 204269466 U | | 4/2015 |
| CN | 106556616 A | * | 4/2017 |
| CN | 106769466 A | * | 5/2017 |
| CN | 106769466 A | | 5/2017 |
| CN | 108088757 A | | 5/2018 |
| CN | 107084884 B | * | 6/2020 |
| JP | H0326963 A | | 2/1991 |

* cited by examiner

TRI-AXIAL MECHANICAL TEST APPARATUS AND METHOD FOR SIMULATING THE PROCESS OF FREEZING HIGH-PRESSURE WATER INTO ICE

CROSS REFERENCE TO RELATED APPLICATIONS

This application is a National Stage Application of International Application Number PCT/CN2018/092553, filed Jun. 25, 2018; which claims priority to Chinese Application No. 201810107065.4, filed Feb. 2, 2018.

I. Technical Field

The present invention relates to the technical field of research on the characteristics of ice mechanics, particularly to a tri-axial mechanical test apparatus and method for simulating the process of freezing high-pressure water into ice.

II. Background Art

Ice mechanics has been developed significantly up to now since the early twentieth century, and the mechanical test of ice is an indispensable research means. In the early stage, the research on ice mechanics mainly focuses on the interaction between ice and structures, and the ice breaking mechanism, etc., the subjects of research are mainly river ice or sea ice, and mechanical tests generally consider the influences of ice temperature and loading rate on the test results.

As the ice mechanics is developed, the subjects of research are extended to plateau permafrost and polar glaciers, etc. Since such ice is subjected to different degrees of original stress in the formation process, the freezing pressure has attracted attention of the researchers in different countries.

Because the conventional ice mechanical test equipment does not take into account the influence of freezing pressure during the development stage, the freezing pressure research task cannot be completed, and the original technical means should be improved to carry out related research. At present, there are mainly two implementation methods:

Method I: the sample preparation apparatus in conventional ice mechanical test is modified by adding a pressurization function to the steel mold, and then the research is carried out according to the conventional ice mechanical test process, i.e., pressurization and freezing are performed first, then the constant temperature curing is carried out, and finally the sample is taken out of the mold and placed in a servo loading apparatus for testing of mechanical properties.

Method II: the sample preparation means is changed, i.e., firstly mono-crystal ice is produced under a non-pressure condition, then the mono-crystal ice is broken up and filtered to obtain ice crystal grains in target size, then the ice crystal grains are loaded into a flexible film and the grain boundary cavities are filled with water to produce an ice sample similar to a saturated soil sample in soil mechanical test, then freezing under pressure is performed in a tri-axial servo apparatus, after the constant temperature curing, testing of mechanical properties is performed (Sammonds P R, Murrell S A E Rist M A, et al., *The design of a high-pressure low-temperature triaxial deformation cell for ice* [J]. *Cold Regions Science Technology*, 1991, 19(2):177-188).

However, both of the above methods have significant drawbacks: although the method I can be used to freeze water and prepare an ice sample under a pressurized freezing condition, it does not make a breakthrough from the research ideas of conventional equipment; specifically, during testing of mechanical properties, the ice sample must be removed from the mold first, and then packed and loaded into a tri-axial pressure chamber for testing; obviously there is a process of unloading followed by loading, and whether the stress history will have an influence on the ice mechanical test result needs to be further studied; although the method II can be implemented in a tri-axial servo apparatus to avoid the influence of stress history in the sample preparation process, it requires a prerequisite of obtaining ice crystal grains in fixed size, and the influence of freezing pressure on the mechanical properties of ice samples directly frozen from water cannot be studied.

III. Contents of the Invention

Technical Problem: to overcome the drawbacks of the existing ice mechanical test apparatuses and methods in the prior art, the present invention provides an apparatus and method for tri-axial test of ice samples directly frozen from water under pressure under a controlled stress condition in the entire process.

Technical Scheme: the tri-axial mechanical test apparatus for simulating the process of freezing the high-pressure water into ice in the present invention comprises a main body loading system, a freezing system, and a sample test system;

The main body loading system comprises a flange, a pressure-bearing shell, an axial pressure piston, a sample base, a liquid inflow loading pipe, an exhaust pipe and an insulating layer; the flange, the pressure-bearing shell and the axial pressure piston are constituted to a loading main body; the flange is in a stepped shape, snap-fitted to the bottom of the pressure-bearing shell, and connected to the pressure-bearing shell by hexagonal socket-head bolts, and the insulating layer is provided at the outer sides of the flange and the pressure-bearing shell; the axial pressure piston extends through a center hole at the top of the pressure-bearing shell into the loading main body; the sample base is disposed on the flange, and is sealed with the flange via a seal ring; the liquid inflow loading pipe and the exhaust pipe are connected to the holes in the flange through the insulating layer, and communicated with a confining pressure loading space inside the pressure-bearing shell;

The freezing system comprises a circumferential freezing liquid circulation channel, a circumferential freezing liquid inflow pipe, a circumferential freezing liquid outflow pipe, a base freezing liquid circulation channel, a base freezing liquid inflow pipe, a base freezing liquid outflow pipe and a dissoluble shell; the circumferential freezing liquid circulation channel is disposed inside an outer wall of the pressure-bearing shell, the top end thereof is connected with the circumferential freezing liquid outflow pipe, and the bottom end thereof is connected with the circumferential freezing liquid inflow pipe; the base freezing liquid circulation channel is disposed at the bottom end of the sample base; the base freezing liquid inflow pipe and the base freezing liquid outflow pipe are disposed inside the flange respectively, and communicated with the base freezing liquid circulation channel; the dissoluble shell is disposed above the sample base in the same axial line as the axial pressure piston, and an inner surface thereof tightly abuts against an outer surface of a latex film; the dissoluble shell is in a solid state initially, gradually dissolved by a hydraulic solvent during the test process, and loses the lateral confinement efficacy after the sample turns into a solid state completely;

The sample test system comprises a sample, a pressing head, a latex film, a serial of axial optical fiber sensors, and a serial of circumferential optical fiber sensors; the pressing head is disposed at the bottom end of the axial pressure piston, the sample is disposed between the pressing head and the sample base, the latex film is wrapped on the outer side of the sample and sealed with the outer sides of the pressing head and the sample base at the top end and bottom end thereof by seal rings respectively, and the latex film is configured to isolate the sample from the hydraulic solvent after the dissoluble shell is dissolved to ensure that the sample cannot contact with the hydraulic solvent; the serial of axial optical fiber sensors and the serial of circumferential optical fiber sensors are preset at the central axial line and central circumferential line of the sample respectively and are led out through the sample base and the flange.

A seal ring is disposed between the center hole at the top of the pressure-bearing shell and the axial pressure piston matched with the center hole.

A seal ring is disposed in a snap-fitted position between the pressure-bearing shell and the flange. The pressure-bearing shell is provided with an annular film heater in a region of its top surface near the piston hole, to control the icing direction in the freezing test and prevent icing at a contact part between the pressure-bearing shell and the axial pressure piston.

The serial of axial optical fiber sensors and the serial of circumferential optical fiber sensors are preset in the sample, to collect sample deformation and temperature data in the test process.

The pressing head has a water inlet configured to inject water into the latex film.

A tri-axial mechanical test method for simulating the process of freezing high-pressure water into ice by using the apparatus described above, comprises: the entire test process is carried out in a tri-axial servo tester; the axial pressure is applied via a axial pressure piston by an axial pressure control unit of the tri-axial servo tester, a confining pressure control unit of the tri-axial servo tester is connected to a liquid inflow loading pipe via an oil-water separator, and the pressure of a hydraulic solvent inside a pressure-bearing shell is controlled indirectly via a servo hydraulic oil to complete the tri-axial mechanical test; the test process mainly comprises two stages of a freezing stage and a tri-axial mechanical test stage;

In the freezing stage, the axial pressure and confining pressure of the apparatus are adjusted according to a preset freezing pressure; according to the predetermined freezing method, a freezing liquid at a preset temperature is conveyed continuously from an external cold source to a circumferential freezing liquid circulation channel and a base freezing liquid circulation channel respectively, to decrease the temperature of a confining pressure chamber and the sample and form a solid-state sample at a preset temperature, and a serial of axial optical fiber sensors and a serial of circumferential optical fiber sensors are connected to an external optical fiber data collector to measure the temperature of the sample in the process;

In the tri-axial mechanical test stage, the temperature of the sample is kept unchanged; the axial pressure and confining pressure that vary under a predefined rule are applied to the sample according to preset stress paths, and the deformation data of the sample is read via the serial of axial optical fiber sensors and the serial of circumferential optical fiber sensors.

Benefits: the present invention is suitable for research on the characteristics of ice mechanics, particularly for research on the influence of freezing pressure on ice mechanics; with the above-mentioned technical solution, the apparatus and method provided in the present invention have the following advantages over the prior art:

(1) The present invention cooperates with a tri-axial servo tester, an oil-water separator, an external cold source and an optical fiber data collector, so that the water can be frozen into ice under pressure under the confinement of a dissoluble shell that is dissolved after an ice sample is formed, and then the tri-axial mechanical test can be carried out directly in the original stress state after water is frozen into ice under pressure;

(2) In the present invention, the dissoluble shell achieves a lateral confinement effect in the water freezing process, in order to ensure that the shape of the formed ice meets the test requirement; the dissoluble shell is dissolved gradually by the hydraulic solvent during the test and loses the lateral confinement efficacy after the sample turns into a solid state; thus, it is only to adjust the thickness of the dissoluble shell according to the freezing time in the test design;

(3) Since the present invention is provided with a base freezing liquid circulation channel and a circumferential freezing liquid circulation channel, different freezing modes can be performed under a controlled stress condition, including unidirectional freezing from bottom to top or circumferential freezing from outside to inside, etc., and the present invention can be used to study the influence of different freezing modes on the characteristics of ice mechanics;

(4) In the present invention, an annular film heater is provided in a region of the top surface of the pressure-bearing shell near the piston hole, to control the temperature of the top surface of the apparatus; thus, on one hand, the overall temperature gradient of the apparatus can be adjusted and the sample freezing mode can be controlled during the freezing; on the other hand, icing at the contact part between the pressure-bearing shell and the axial pressure piston can be prevented, and the accuracy of test can be improved;

(5) In the present invention, a serial of axial optical fiber sensors and a serial of circumferential optical fiber sensors are preset in the sample, to measure the internal deformation and temperature of the sample during the test;

(6) The present invention may be used to make research on the mechanical properties and parameters of other materials under a pressurized solidification condition.

IV. Description of Drawings

In the figures: 1—axial pressure piston; 2—insulating layer; 3—exhaust pipe; 4—circumferential freezing liquid outflow pipe; 5'sample; 6—latex film; 7—dissoluble shell; 8—circumferential freezing liquid inflow pipe; 9—liquid inflow loading pipe; 10—film heater; 11—pressure-bearing shell; 12—pressing head; 1—circumferential freezing liquid circulation channel; 14—hydraulic solvent; 15—sample base; 16—base freezing liquid inflow pipe; 17—hexagonal socket-head bolt; 18—base freezing liquid circulation channel; 19—base freezing liquid outflow pipe; 20—serial of axial optical fiber sensors; 21—serial of circumferential optical fiber sensors; 22—flange.

V. Embodiments

Hereunder an embodiment of the present invention will be further detailed with reference to the drawings.

Figure 1:
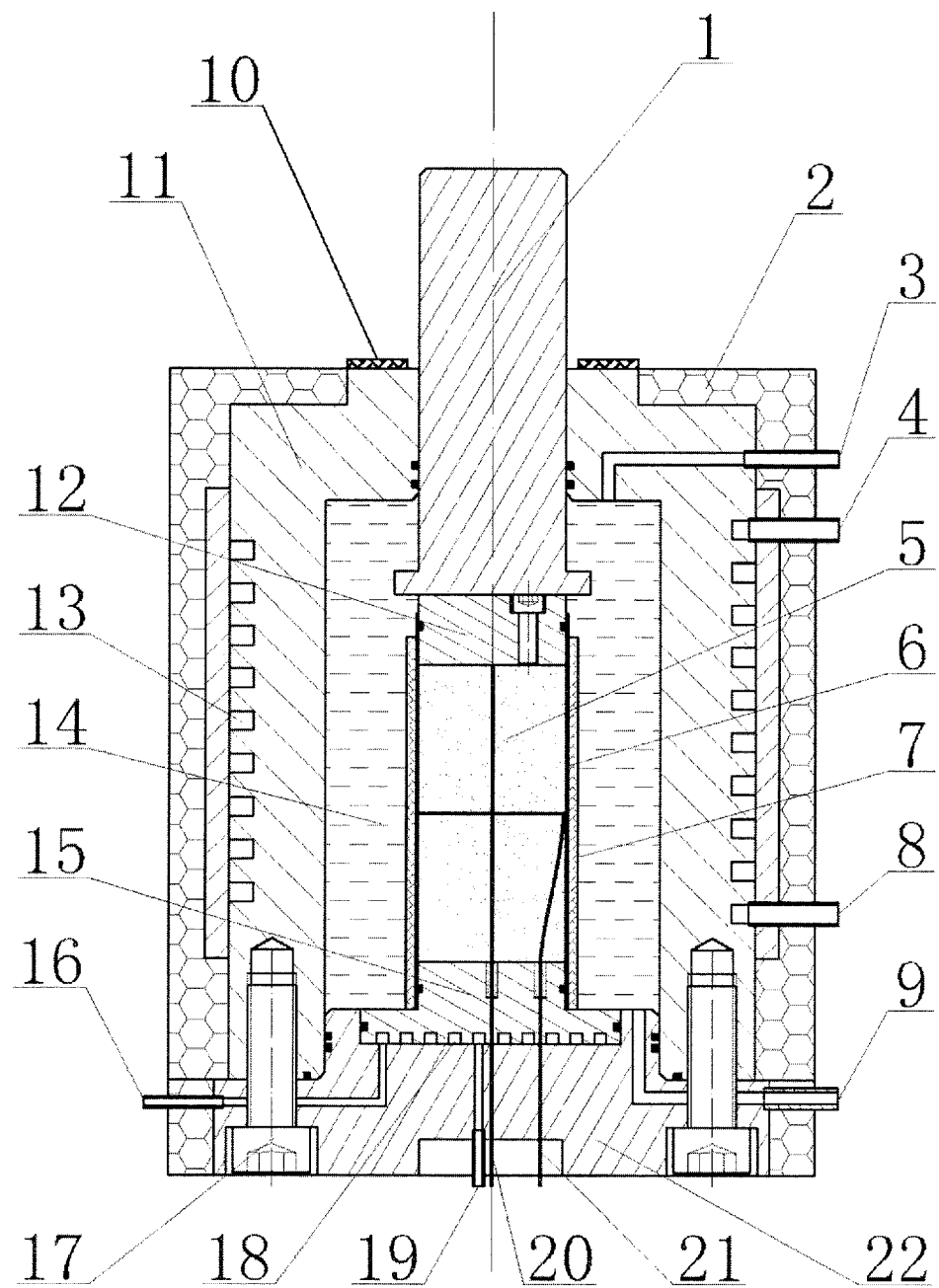
FIG. 1 is a structural schematic view according to the present invention.

As shown in FIG. 1, the tri-axial mechanical test apparatus for simulating the process of freezing high-pressure water into ice in the present invention mainly comprises a main body loading system, a freezing system, and a sample test system, wherein, The main body loading system comprises a flange 22, a pressure-bearing shell 11, an axial pressure piston 1, a sample base 15, a liquid inflow loading pipe 9, an exhaust pipe 3, and an insulating layer 2; the flange 22, the pressure-bearing shell 11 and the axial pressure piston 1 are constituted to a loading main body; the flange 22 is in a stepped shape, snap-fitted to the bottom of the pressure-bearing shell 11, and connected to the pressure-bearing shell 11 by hexagonal socket-head bolts 17, and the insulating layer 2 is provided at the outer sides of the flange 22 and the pressure-bearing shell 11; the axial pressure piston 1 extends through a center hole at the top of the pressure-bearing shell 11 into the loading main body; the sample base 15 is disposed on the flange 22, and is sealed with the flange 22 via a seal ring; the liquid inflow loading pipe 9 and the exhaust pipe 3 are connected to the holes in the flange 22 through the insulating layer 2, and communicated with a confining pressure loading space inside the pressure-bearing shell 11; a seal ring is disposed between the center hole at the top of the pressure-bearing shell 11 and the axial pressure piston 1 matched with the center hole; a seal ring is disposed in a snap-fitted position between the pressure-bearing shell 11 and the flange 22.

The freezing system comprises a circumferential freezing liquid circulation channel 13, a circumferential freezing liquid inflow pipe 8, a circumferential freezing liquid outflow pipe 4, a base freezing liquid circulation channel 18, a base freezing liquid inflow pipe 16, a base freezing liquid outflow pipe 19 and a dissoluble shell 7; the circumferential freezing liquid circulation channel 13 is disposed inside an outer wall of the pressure-bearing shell 11, the top end thereof is connected with the circumferential freezing liquid outflow pipe 4, and the bottom end thereof is connected with the circumferential freezing liquid inflow pipe 8; the base freezing liquid circulation channel 18 is disposed at a bottom end of the sample base 15; the base freezing liquid inflow pipe 16 and the base freezing liquid outflow pipe 19 are disposed inside the flange 22 respectively, and communicated with the base freezing liquid circulation channel 18; the dissoluble shell 7 is disposed above the sample base 15 in the same axial line as the axial pressure piston 1, and an inner surface thereof tightly abuts against an outer surface of a latex film 6; the dissoluble shell 7 achieves a lateral confinement effect in the freezing process of water, in order to ensure that the shape of the formed ice meets the test requirement; the dissoluble shell 7 is in a solid state initially, gradually dissolved by the hydraulic solvent 13 during the test process, and loses the lateral confinement efficacy after the sample 5 turns into a solid state completely; thus, it is only to adjust the thickness of the dissoluble shell 7 according to the freezing time in the test design. The pressure-bearing shell 11 is provided with an annular film heater 10 in a region of its top surface near the piston hole, to control the icing direction in the freezing test and prevent icing at a contact part between the pressure-bearing shell 11 and the axial pressure piston 1.

The sample test system comprises a sample 5, a pressing head 12, a latex film 6, a serial of axial optical fiber sensors 20, and a serial of circumferential optical fiber sensors 21; the pressing head 12 is disposed at the bottom end of the axial pressure piston 1, the sample 5 is disposed between the pressing head 12 and the sample base 15, the serial of axial optical fiber sensors 20 and the serial of circumferential optical fiber sensors 21 are preset in the sample 5 to collect sample deformation and temperature data in the test process. The latex film 6 is wrapped on the outer side of the sample 5, and sealed with the outer sides of the pressing head 12 and the sample base 15 at the top end and bottom end thereof by seal rings respectively; the pressing head 12 has a water inlet for injecting water into the latex film 6. The latex film 6 is configured to isolate the sample 5 from the hydraulic solvent 14 after the dissoluble shell 7 is dissolved, to ensure that the sample 5 cannot contact with the hydraulic solvent 14; the serial of axial optical fiber sensors 20 and the serial of circumferential optical fiber sensors 21 are preset at the central axial line and central circumferential line of the sample 5 respectively and are led out through the sample base 15 and the flange 22.

A tri-axial mechanical test method for simulating the process of freezing high-pressure water into ice in the present invention is as follows: the entire test process is carried out in a tri-axial servo tester; specifically, the axial pressure is applied via a axial pressure piston 1 by an axial pressure control unit of the tri-axial servo tester, a confining pressure control unit of the tri-axial servo tester is connected to a liquid inflow loading pipe 9 via an oil-water separator, and the pressure of a hydraulic solvent 14 inside a pressure-bearing shell 11 is controlled indirectly via a servo hydraulic oil to complete the tri-axial mechanical test; the test process mainly comprises two stages of a freezing stage and a tri-axial mechanical test stage;

In the freezing stage, the axial pressure and confining pressure of the apparatus are adjusted according to a preset freezing pressure; according to the predetermined freezing method, a freezing liquid at a preset temperature is conveyed continuously from an external cold source to a circumferential freezing liquid circulation channel 13 and a base freezing liquid circulation channel 18 respectively, to decrease the temperature of a confining pressure chamber and the sample 5 and form a solid-state sample 5 at a preset temperature, and a serial of axial optical fiber sensors 20 and a serial of circumferential optical fiber sensors 21 are connected to an external optical fiber data collector to measure the temperature of the sample 5 in the process;

In the tri-axial mechanical test stage, the temperature of the sample 5 is kept unchanged; the axial pressure and confining pressure that vary under a predefined rule are applied to the sample 5 according to preset stress paths, and the deformation data of the sample 5 is read via the serial of axial optical fiber sensors 20 and the serial of circumferential optical fiber sensors 21.

Hereunder the test method will be detailed in an example of a pressurized unidirectional freezing tri-axial test. To carry out the test, a cold source, an oil-water separator, a tri-axial servo tester and an optical fiber data collector are required. The test includes 4 processes, i.e., assembling of the apparatus, pressurized freezing, the constant temperature curing, and tri-axial test. Specifically, the steps are as follows:

1) Assembling of the Apparatus a. Firstly, a latex film 6 is taken out and the position of a serial of circumferential optical fiber sensors 21 is marked on the inner side of the latex film 6; then, a serial of circumferential optical fiber sensors 21 is bonded to the position marked on the inner side of the latex film 6, and the latex film 6 is fixed to the top end of a sample base 15 by a seal ring; then, the serial of circumferential optical fiber sensors 21 and the serial of axial optical fiber sensors 20 are passed through the base 15 and led out from the bottom end of the flange 22, and a preformed holes in the sample base 15 are sealed; then, the top end of the serial of axial optical fiber sensors 20 is fixed to the center of the bottom end of a pressing head 12, and the top end of the latex film 6 is sealed with a seal ring at the outer side of the pressing head 12;

b. Deaerated water is injected into the latex film via a water inlet on the pressing head 12, then the water inlet is sealed by bolts after the water is fully filled and the air is exhausted; the dissoluble shell 7 is fitted at the outer side of the latex film 6 in a way that the top end of the dissoluble shell 7 is slightly lower than the top surface of the pressing head 12 and the bottom end of the dissoluble shell 7 is placed on the surface of a lower step of the base 15;

c. Finally, the pressure-bearing shell 11 in which the axial pressure piston 1 is mounted is placed on the top end of the flange 22, and is fastened with the flange 22 by hexagonal socket-head bolts 17.

Figure 2:
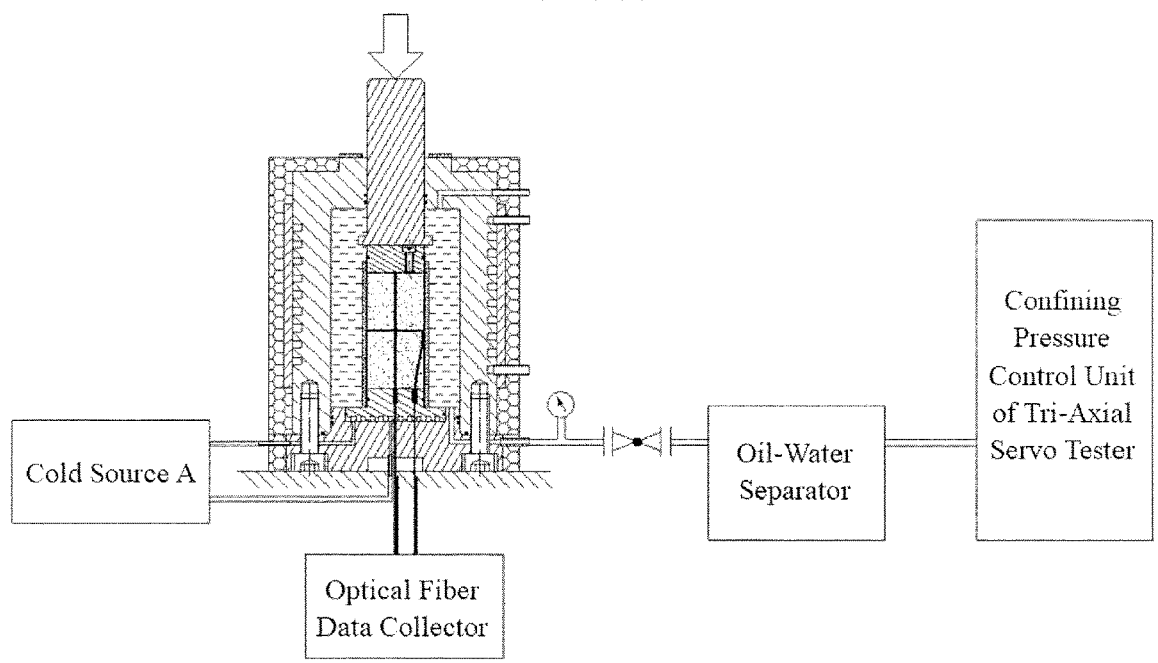
FIG. 2 is a schematic view of connections of the apparatus in the pressurized freezing stage in an embodiment of the present invention.

2) Pressurized Freezing a. Firstly, the apparatus is transferred into a tri-axial servo tester, and an axial loading module of the tri-axial servo tester is lowered to fully contacting with the top end of the axial pressure piston 1; then, a hydraulic solvent 14 is filled through a liquid inflow loading pipe 9 into the internal space of the apparatus; at that point, the dissoluble shell 7 is gradually dissolved;

b. The liquid inflow loading pipe 9 is connected with an oil-water separator, the other end of the oil-water separator is connected to a confining pressure control unit of the tri-axial servo tester; the confining pressure in the apparatus is controlled indirectly via the oil-water separator by the confining pressure control unit of the tri-axial servo tester, the auxiliary device of the tri-axial servo tester is operated to load the axial pressure and the confining pressure to preset values at the same loading rate;

c. Finally, a base freezing liquid inflow pipe 16 and a base freezing liquid outflow pipe 19 are connected to a cold source A, and the serial of axial optical fiber sensors 20 and the serial of circumferential optical fiber sensors 21 are connected to an optical fiber data collector respectively and the acquisition of temperature data is started after debugging; the cold source A is started, and freezing is carried out according to a preset freezing temperature; the freezing progress is judged by the optical fiber data collector; this stage is finished when the sample 5 is frozen to the preset temperature, as shown in FIG. 2.

3) The Constant Temperature Curing

Figure 3:
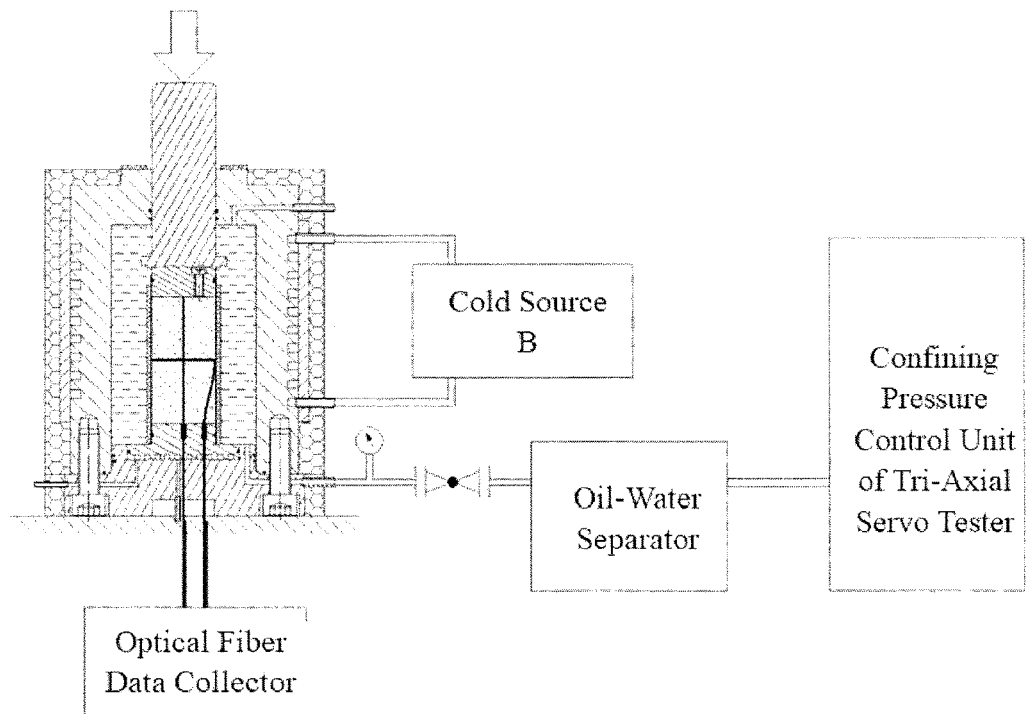
FIG. 3 is a schematic view of the connections of the apparatus during the constant temperature curing and tri-axial mechanical test in an embodiment of the present invention.

After the pressurized freezing is finished, the sample 5 is maintained at the preset test temperature for 24 h before the tri-axial test is started; the preset test temperature may be determined within a range of 0° C.-70° C. as required;

The setting of the tri-axial servo tester in the step 1) is maintained, a circumferential freezing liquid inflow pipe 8 and a circumferential freezing liquid outflow pipe 4 are connected to a cold source B, the cold source A is stopped, and the connection between the tri-axial mechanical test apparatus and the cold source A is cut off; the cold source B is started, and a freezing liquid is charged at the preset test temperature for maintaining pressure and low-temperature curing of the frozen sample 5 under pressure; the dissoluble shell 7 is completely dissolved in the curing stage; this stage is finished when the constant temperature curing at the test temperature is maintained for 24 h; the connections of the apparatus in the curing stage is shown in FIG. 3;

4) Tri-Axial Test

After the above-mentioned work is finished, the cold source B is used to control the temperature of the tri-axial mechanical test apparatus further, and the tri-axial servo tester is operated to carry out tri-axial shear test; the axial strain and circumferential strain in the sample 5 are measured by an optical fiber data collector in the test process, the test data is logged once the sample is broken, and the test is finished; the connections of the apparatus in the tri-axial test stage are shown in FIG. 3.

The invention claimed is:

1. A tri-axial mechanical test apparatus for simulating a process of freezing high-pressure water into ice, wherein said apparatus comprises:
   a main body loading system;
   a freezing system, and
   a sample test system,
   wherein the main body loading system comprises:
      a flange;
      a pressure-bearing shell;
      an axial pressure piston;
      a sample base;
      a liquid inflow loading pipe;
      an exhaust pipe; and
      an insulating layer,
   wherein the flange, the pressure-bearing shell and the axial pressure piston are constituted to a loading main body,
   wherein the flange is in a stepped shape, snap-fitted to a bottom of the pressure-bearing shell, and connected to the pressure-bearing shell by hexagonal socket-head bolts,
   wherein the insulating layer is provided at outer sides of the flange and the pressure-bearing shell,
   wherein the axial pressure piston extends through a center hole at a top of the pressure-bearing shell into the loading main body,
   wherein the sample base is disposed on the flange, and is sealed with the flange via a seal ring,
   wherein the liquid inflow loading pipe and the exhaust pipe are connected to holes in the flange through the insulating layer and communicated with a confining pressure loading space inside the pressure-bearing shell,
   wherein the freezing system comprises:
      a circumferential freezing liquid circulation channel;
      a circumferential freezing liquid inflow pipe;
      a circumferential freezing liquid outflow pipe;
      a base freezing liquid circulation channel;
      a base freezing liquid inflow pipe;
      a base freezing liquid outflow pipe; and
      a dissoluble shell,
   wherein the circumferential freezing liquid circulation channel is disposed inside an outer wall of the pressure-bearing shell, a top end thereof is connected with the circumferential freezing liquid outflow pipe, and a bottom end thereof is connected with the circumferential freezing liquid inflow pipe,
   wherein the base freezing liquid circulation channel is disposed at a bottom end of the sample base, wherein the base freezing liquid inflow pipe and the base freezing liquid outflow pipe are disposed inside the flange, respectively, and communicated with the base freezing liquid circulation channel, wherein the dissoluble shell is disposed above the sample base in a same axial line as the axial pressure piston, and an inner surface thereof tightly abuts against an outer surface of a latex film, wherein the dissoluble shell is in a solid state initially, gradually dissolved by a hydraulic solvent during a test process, and loses a lateral confinement efficacy after a sample turns into a solid state completely, wherein the sample test system comprises:
the sample;
a pressing head;
a latex film;
a serial of axial optical fiber sensors; and
a serial of circumferential optical fiber sensors, wherein the pressing head is disposed at a bottom end of the axial pressure piston, wherein the sample is disposed between the pressing head and the sample base, wherein the latex film is wrapped on an outer side of the sample and sealed with outer sides of the pressing head and the sample base at a top end and a bottom end thereof by first seal rings, respectively, wherein the latex film is configured to isolate the sample from the hydraulic solvent after the dissoluble shell is dissolved to ensure that the sample cannot contact the hydraulic solvent, and wherein the serial of axial optical fiber sensors and the serial of circumferential optical fiber sensors are preset at a central axial line and a central circumferential line of the sample, respectively, and are led out through the sample base and the flange.

2. The tri-axial mechanical test apparatus for simulating the process of freezing high-pressure water into ice according to claim 1, wherein a second seal ring is disposed between the center hole at the top of the pressure-bearing shell and the axial pressure piston matched with the center hole.

3. The tri-axial mechanical test apparatus for simulating the process of freezing high-pressure water into ice according to claim 1, wherein a third seal ring is disposed in a snap-fitted position between the pressure-bearing shell and the flange.

4. The tri-axial mechanical test apparatus for simulating the process of freezing high-pressure water into ice according to claim 1, wherein the pressure-bearing shell is provided with an annular film heater in a region of its top surface near a piston hole, to control an icing direction in the test process and prevent icing at a contact part between the pressure-bearing shell and the axial pressure piston.

5. The tri-axial mechanical test apparatus for simulating the process of freezing high-pressure water into ice according to claim 1, wherein the serial of axial optical fiber sensors and the serial of circumferential optical fiber sensors are preset in the sample, to collect sample deformation data and temperature data in the test process.

6. The tri-axial mechanical test apparatus for simulating the process of freezing high-pressure water into ice according to claim 1, wherein the pressing head has a water inlet configured to inject water into the latex film.

7. A tri-axial mechanical test method for simulating the process of freezing high-pressure water into ice by using the apparatus according to claim 1, wherein said method comprises:

placing the tri-axial mechanical test apparatus in a tri-axial servo tester where an entirety of the tri-axial mechanical test method is carried out;

applying the axial pressure via the axial pressure piston by an axial pressure control unit of the tri-axial servo tester;

connecting a confining pressure control unit of the tri-axial servo tester to the liquid inflow loading pipe via an oil-water separator; and controlling a pressure of a hydraulic solvent inside the pressure-bearing shell indirectly via a servo hydraulic oil to complete the tri-axial test method, wherein the tri-axial mechanical test method comprises a freezing stage and a tri-axial mechanical test stage;

wherein the tri-axial mechanical test method comprises, in the freezing stage, adjusting an axial pressure and confining pressure of the apparatus according to a preset freezing pressure;

according to a predetermined freezing method, conveying a freezing liquid at a first preset temperature continuously from an external cold source to the circumferential freezing liquid circulation channel and the base freezing liquid circulation channel, respectively, to decrease a temperature of a confining pressure chamber and a temperature of the sample and form a solid-state sample at a second preset temperature; and connecting the serial of axial optical fiber sensors and the serial of circumferential optical fiber sensors to an external optical fiber data collector to measure the temperature of the sample in the process, and wherein the tri-axial mechanical test method comprises, in the tri-axial mechanical test stage:

keeping the temperature of the sample unchanged;

applying the axial pressure and confining pressure that vary under a predefined rule to the sample according to preset stress paths; and reading deformation data of the sample via the serial of axial optical fiber sensors and the serial of circumferential optical fiber sensors.

* * * * *